(12) United States Patent
Schumacher et al.

(10) Patent No.: US 9,157,279 B2
(45) Date of Patent: Oct. 13, 2015

(54) METHOD OF AND SYSTEM FOR DRILLING INFORMATION MANAGEMENT AND RESOURCE PLANNING

(75) Inventors: Forrest Paul Schumacher, Salt Lake City, UT (US); Jeffrey J. Schwoebel, Crozet, VA (US); Michael J. Hardin, Draper, UT (US); Daniel J. Brunner, Sandy, UT (US)

(73) Assignee: REI, Inc., Salt Lake City, UT (US)

( * ) Notice: Subject to any disclaimer, the term of this patent is extended or adjusted under 35 U.S.C. 154(b) by 786 days.

(21) Appl. No.: 13/495,164

(22) Filed: Jun. 13, 2012

(65) Prior Publication Data

US 2012/0318578 A1    Dec. 20, 2012

Related U.S. Application Data

(60) Provisional application No. 61/496,906, filed on Jun. 14, 2011.

(51) Int. Cl.
  *E21B 47/00* (2012.01)
  *E21B 7/04* (2006.01)
  *E21B 7/06* (2006.01)
  *E21B 44/00* (2006.01)

(52) U.S. Cl.
  CPC .. *E21B 7/06* (2013.01); *E21B 44/00* (2013.01)

(58) Field of Classification Search
  CPC ......... E21B 44/00; E21B 7/06; E21B 47/022; E21B 44/005; E21B 44/02; E21B 47/12; G01V 11/00; G01V 11/005; G01V 1/44; G06F 15/00
  See application file for complete search history.

(56) References Cited

U.S. PATENT DOCUMENTS

| | | | | |
|---|---|---|---|---|
| 6,206,108 | B1* | 3/2001 | MacDonald et al. | 175/24 |
| 7,002,484 | B2 | 2/2006 | McElhinney | |
| 8,489,333 | B2* | 7/2013 | Bonavides et al. | 702/6 |
| 2008/0151690 | A1* | 6/2008 | Tang et al. | 367/35 |
| 2009/0090555 | A1* | 4/2009 | Boone et al. | 175/45 |
| 2010/0250139 | A1 | 9/2010 | Hobbs et al. | |
| 2011/0106514 | A1* | 5/2011 | Omeragic et al. | 703/10 |
| 2012/0318578 | A1* | 12/2012 | Schumacher et al. | 175/40 |
| 2013/0153206 | A1* | 6/2013 | Cairns et al. | 166/66 |
| 2014/0163888 | A1* | 6/2014 | Bowler et al. | 702/9 |

FOREIGN PATENT DOCUMENTS

WO    WO-2010128959 A1    11/2010

OTHER PUBLICATIONS

Copenheaver, Blaine R., "International Search Report" for the International Applicaiton PCT/US2012/042144 as mailed Sep. 5, 2012 (4 pages).

* cited by examiner

*Primary Examiner* — Daniel P Stephenson
(74) *Attorney, Agent, or Firm* — Winstead PC

(57) ABSTRACT

In one aspect, the present invention relates to a drilling-information-management system. The drilling-information management system includes a probe assembly disposed on a drill rod, a first computer interoperably coupled to the probe assembly via a conductor disposed in a drill rod, and a second computer in communication with the first computer. The second computer includes a barcode scanner. The drilling-information management system includes a database in communication with the second computer. Drilling-project data is transferred from the database to the second computer and calibration data is transferred from the second computer to the first computer. The first computer executes a drilling plan according to the drilling-project data.

20 Claims, 8 Drawing Sheets

METHOD OF AND SYSTEM FOR DRILLING INFORMATION MANAGEMENT AND RESOURCE PLANNING

CROSS-REFERENCE TO RELATED APPLICATIONS

This application claims priority to, and incorporates by reference for any purpose, the entire disclosure of U.S. Provisional Patent Application No. 61/496,906, filed Jun. 14, 2011.

BACKGROUND

1. Field of the Invention

The present invention relates to management systems for drilling projects and more particularly, but not by way of limitation, to systems for managing information associated with an underground directional-drilling project including, for example, drilling plans, drilling data, material consumption, equipment wear, equipment maintenance, and project cost.

2. History of the Related Art

The practice of drilling non-vertical wells via directional drilling (sometimes referred to as "slant drilling") has become very common in energy and mining industries. Directional drilling exposes a larger section of a subterranean reservoir than vertical drilling, and allows multiple subterranean locations to be reached from a single drilling location thereby reducing costs associated with operating multiple drilling rigs. In addition, directional drilling often allows access to subterranean formations where vertical access is difficult or impossible such as, for example, formations located under a populated area or formations located under a body of water or other natural impediment.

Despite the many advantages of directional drilling, high cost associated with completing a well is often cited as the largest shortcoming of directional drilling. This is due to the fact that directional drilling is often much slower than vertical drilling due to requisite data-acquisition steps. Thus, controlling and managing costs becomes a chief concern during directional-drilling.

SUMMARY

The present invention relates to management systems for drilling projects and more particularly, but not by way of limitation, to systems for managing information associated with an underground directional-drilling project including, for example, drilling plans, drilling data, material consumption, equipment wear, equipment maintenance, drilling performance, and project cost. In one aspect, the present invention relates to a method for executing a directional-drilling project. The method includes storing drilling-project data on a database, transferring the drilling-project data from the database to a second computer having a barcode scanner, and utilizing the barcode scanner to input equipment information to the second computer. The method further includes transferring calibration data from the second computer to a first computer, executing a drilling plan, via the first computer, according to the drilling-project data, and transferring survey information from a downhole probe assembly to the first computer.

In another aspect, the present invention relates to a method of managing a drilling project. The method includes storing drilling-project data on a database, compiling, via the database, drilling-requirements data, transferring the drilling-requirements data to a drilling-management entity, retrieving the drilling-project data from the database by a second computer having a barcode scanner. The method further includes utilizing the barcode scanner to input equipment information into the second computer, transferring calibration data from the second computer to a first computer, and executing a drilling plan, via the first computer, in accordance with the drilling-project data.

In another aspect, the present invention relates to a drilling-information-management system. The drilling-information management system includes a probe assembly disposed on a drill string, a first computer interoperably coupled to the probe assembly via a conductor disposed in a drill rod, and a second computer in communication with the first computer. The second computer includes a barcode scanner. The drilling-information management system includes a database in communication with the second computer. Drilling-project data is transferred from the database to the second computer and calibration data is transferred from the second computer to the first computer. The first computer executes a drilling plan according to the drilling-project data.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein.

During a directional-drilling project, a drill operator is provided a well path that is predetermined by engineers and geologists prior to drilling. When the directional-drilling project is started, frequent surveys are taken with downhole instruments to provide survey data including, for example, pitch and azimuth, of a well bore. As used herein, the term "pitch" refers to an angular measurement of deviation of the well bore relative to a vertical plane. As used herein, the term "azimuth" refers to an angle of the well bore as projected onto a horizontal plane relative to due north. In some cases, tools such as, for example, a measurement-while-drilling tool ("MWD") and a logging-while-drilling ("LWD") tool are added to a drill string to provide continuous updated measurement allowing for real-time or near-real-time monitoring and adjustments.

Figure 1A:
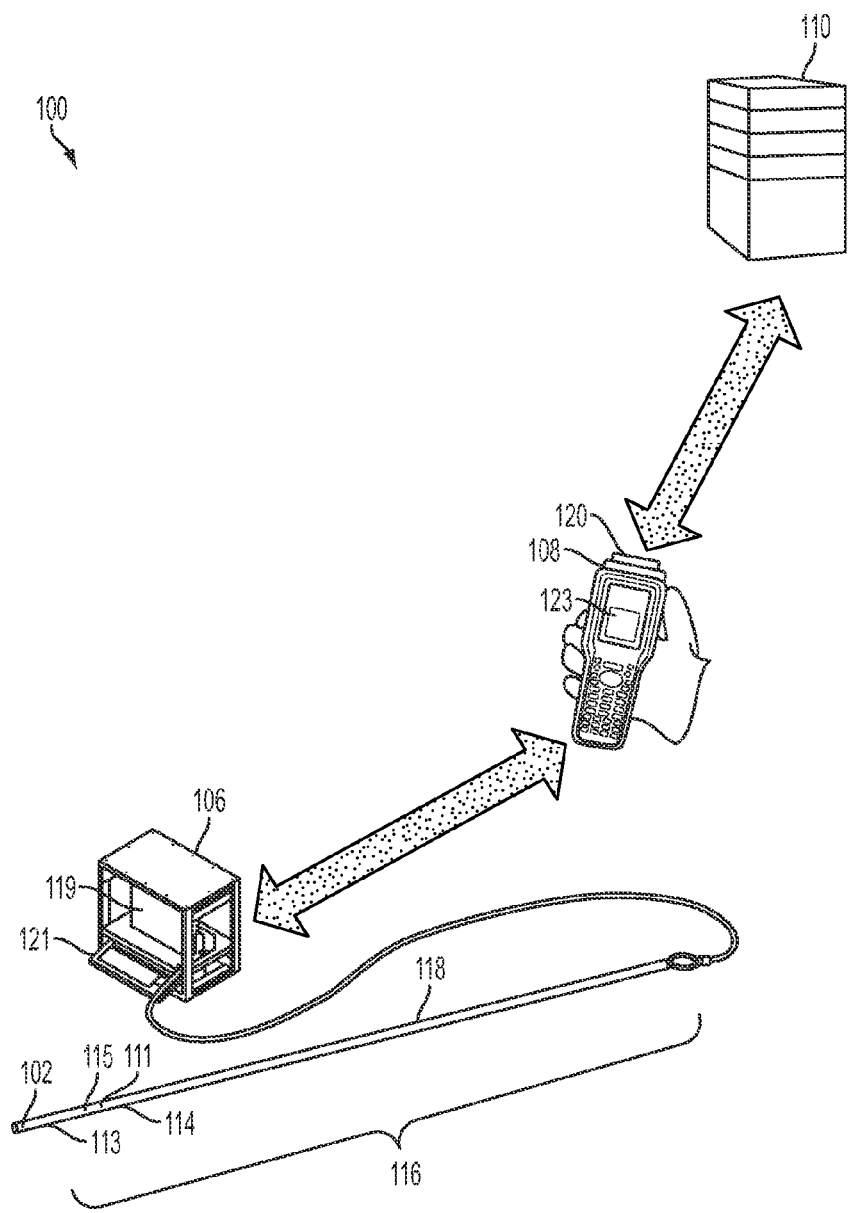
FIG. 1A is a schematic diagram of a drilling-information-management system according to an exemplary embodiment.

FIG. 1A is a schematic diagram of a drilling-information-management system according to an exemplary embodiment. A drilling-information-management system 100 includes a probe assembly 102 coupled to a drill rod 118. The probe assembly 102 communicates with a first computer 106. The drilling-information-management system 100 also includes a second computer 108 interoperably coupled to the first computer 106, and a database 110 interoperably coupled to the second computer 108. The probe assembly 102 includes a battery pack 111 and a plurality of drilling-data-acquisition instruments such as, for example, a directional sensor 113 having, for example, a tri-axial magnetometer and a tri-axial accelerometer and a focused gamma sensor 115. In a typical embodiment, the directional sensor 113 is accurate to approximately 0.1 degrees of inclination and approximately 0.3 degrees azimuth. In a typical embodiment, the focused gamma sensor 115 is accurate to within approximately 5%. In a typical embodiment, the probe assembly 102 is contained in an explosion-proof pressure barrel 114 constructed of a material such as, for example, a copper-beryllium alloy or other non-magnetic alloy. The probe assembly 102 is mounted onto the drill rod 118 via a plurality of shock absorbers and lugs (not explicitly shown). In a typical embodiment, the drill rod 118 is coupled to an adjacent drill rod (not explicitly shown) to form a drill string 116.

Referring still to FIG. 1A, the first computer 106 is, for example, an uphole computer. The first computer 106 includes a user interface 119 such as, for example, a touch screen. In a typical embodiment, the first computer 106 is contained in an explosion-proof housing suitable for use in a variety of drilling environments such as, for example, drilling in a potentially explosive atmosphere. The first computer 106 includes a touch-screen key pad 121 enabling a user to record data such as, for example, a length of the drill string 116 and a position of the drill string 116. In a typical embodiment, the first computer 106 is capable of operating within a temperature range between approximately −20° C. and approximately 45° C. The first computer 106 includes a real-time clock with graphic capabilities. During operation, the first computer 106 is capable of real-time monitoring of actual drilling against a planned hole design. The first computer 106 calculates a position of a borehole based on, for example, pitch, azimuth, and depth. In other embodiments, the first computer 106 may be connected to a plurality of transducers disposed, for example, on the probe assembly 102. The first computer 106 may monitor the plurality of transducers during drilling to obtain measurements of, for example, thrust pressure, water flow, and rotational speed. The first computer 106, via the user interface 119, displays a drilling plan and profile plot, perform tool calibrations, and may display measurements such as, for example, gamma count and gamma tool face as a function of drilling depth. In addition, the first computer 106 may also display environmental data such as, for example, temperature and vibration. In a typical embodiment, the first computer 106 is capable of supporting multiple languages such as, for example, Mandarin, Russian, and English.

Still referring to FIG. 1A, in a typical embodiment, the second computer 108 is contained in an explosion-proof housing. The second computer 108 is, for example, a hand-held device; however, one skilled in the art will recognize that any appropriate data-transfer device could be utilized. The second computer 108 includes a real-time clock having graphic capabilities and is capable of transferring data to, and receiving data from, the first computer 106 and the database 110 via a wireless protocol such as, for example, a wireless local-area-network such as, for example, Wi-Fi®, or a personal-area-network such as, for example, Bluetooth®. In various alternative embodiments, however, the second computer 108 may communicate with the first computer 106 and the database 110 via a wired connection (not explicitly shown). During operation, the second computer 108 calibrates the probe assembly 102. In a typical embodiment, the probe assembly 102 derives an azimuth based on the Earth's magnetic field, commonly referred to as a "magnetic azimuth." Calibration determines a difference between the magnetic azimuth and an azimuth derived from a mine survey grid, commonly referred to as a "grid azimuth." Calibration is performed by orienting the probe assembly 102 along the grid azimuth and comparing the magnetic azimuth, as determined by the probe assembly 102, with the grid azimuth, as determined by a surveyor. During calibration, the probe assembly is rotated along a longitudinal axis to obtain a plurality of data points. Several calibrations may be performed at various grid azimuths.

Still referring to FIG. 1A, the second computer 108 is capable of displaying drilling data in plan and profile views via a display 123. In a typical embodiment, the second computer 108 is capable of supporting multiple languages such as, for example, Mandarin, Russian, and English. The first computer 106 and the second computer 108 have been described by way of example as separate devices; however, in various alternative embodiments, the first computer 106 and the second computer 108 may be combined in a single device such as, for example, a single computer.

Still referring to FIG. 1A, the second computer 108 includes a bar-code scanner 120 for receiving equipment information 352 (shown in FIG. 3) related to the drilling process. The equipment information 352 may include, for example, an identification of parts and equipment used in the drilling process, an identification of consumables used during drilling, and a quantity of consumables used during drilling. One skilled in the art will recognize that, in various alternative embodiments, the second computer 108 may receive the equipment information 352 via any appropriate device such as, for example, a Quick Response ("QR") code reader or an RFID receiver. During drilling, the second computer 108 collects project parameters such as, for example, duration of service of equipment, activities undertaken during a shift, and notification of equipment or drilling issues that arise. In a typical embodiment, the second computer 108 records notifications of equipment and drilling issues via, for example, voice recording or photograph. Although the first computer 106 and the second computer 108 are described in FIG. 1A is being independent devices; one skilled in the art will recognize that, in other embodiments, the first computer 106 and the second computer 108 may be combined in a single device such as, for example, a single computer.

Still referring to FIG. 1A, in a typical embodiment, the database 110 is a virtual-management database; however, one skilled in the art will recognize that, in various alternative embodiments, any appropriate database could be utilized such as, for example, SQL, ODBC, and the like. During operation, the database 110 compiles information received from the second computer 108 and generates, for example, as-drilled plots, daily invoices for services, charges versus budget comparison, estimated time to completion and project charges, project key performance indicators, consumable orders, part orders, inventory orders, rebuild schedules, and safety and risk-management information. In various embodiments, the database 110 stores inventory information related to the drilling process. In a typical embodiment, the database 110 generates plots of information received from the second computer 108 including, for example, borehole orientation relative to plan, gamma polygon, inventory levels, equipment use time, and time-management diagrams. The database 110 is installed on, for example, a remote server with multiple users; however, in various alternative embodiments, the database 110 may be installed on a standalone computer. In a typical embodiment, the database 110 is capable of supporting multiple languages such as, for example, Mandarin, Russian, and English. During operation, a supplier of the drilling-information-management system 100 may access information stored on the database 110. The supplier may assist a user of the drilling-information-management system 100 with, for example, diagnostics, borehole design, drilling problems, and equipment problems. In addition, the supplier may send reminders regarding, for example, servicing of the drilling-information-management system 100 and consumables needs.

Figure 1B:
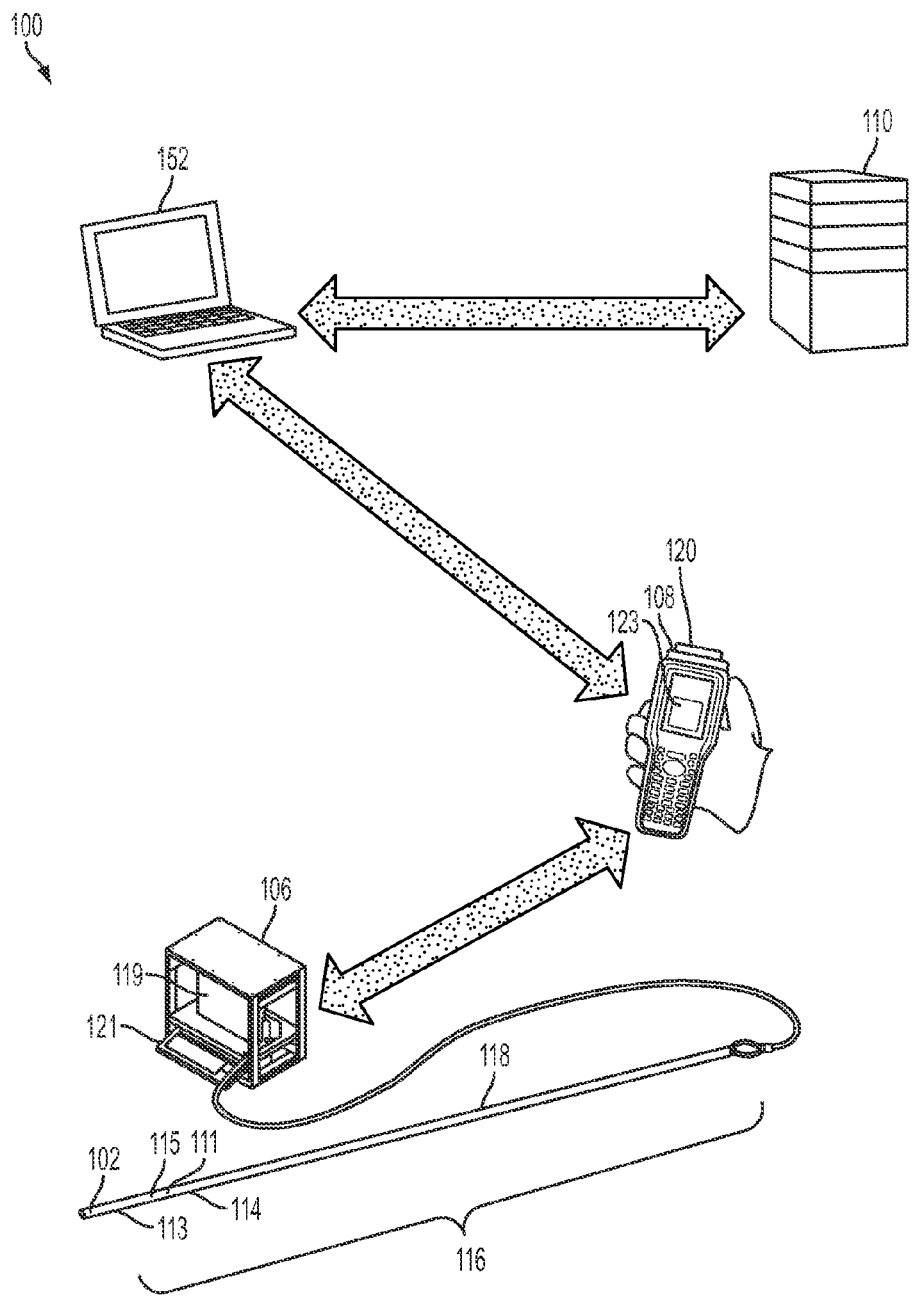
FIG. 1B is a schematic diagram of a drilling-information-management system utilizing a computer according to an exemplary embodiment.

FIG. 1B is a schematic diagram of a drilling-information-management system utilizing a third computer according to an exemplary embodiment. In situations where communication between the second computer 108 and the database 110 is not possible, a third computer 152 is utilized. In a typical embodiment, the third computer 152 is a stand alone database-management system that does not require an internet connection. A local database is installed on the third computer 152. During periods of time where communication between the third computer 152 and the database 110 is possible, the third computer 152 syncs with the database 110. In a typical embodiment, the third computer 152 communicates with the database via a wireless protocol such as, for example, a wireless local-area-network such as, for example, Wi-Fi®, or a personal-area-network such as, for example, Bluetooth®. In a typical embodiment, the third computer 152 is capable of supporting multiple languages such as, for example, Mandarin, Russian, and English. During operation, the third computer 152 compiles information received from the second computer 108 and generates, for example, as-drilled plots, daily invoices for services, charges versus budget comparison, estimated time to completion and project charges, project key performance indicators, consumable orders, part orders, inventory orders, rebuild schedules, and safety and risk-management information. In various alternative embodiments, the third computer 152 may also store inventory information related to the drilling process.

Figure 1C:
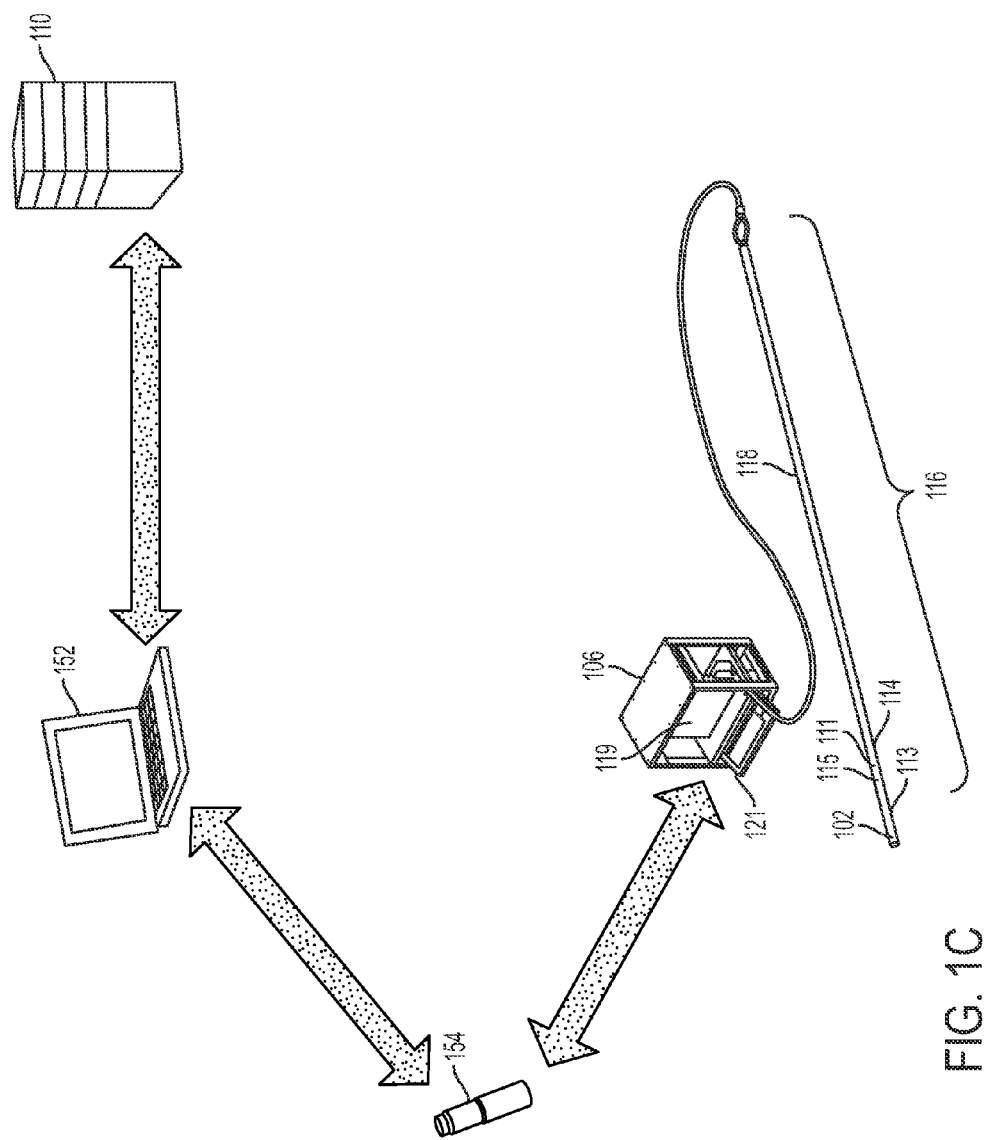
FIG. 1C is a schematic diagram of a drilling-information-management system utilizing a memory device according to an exemplary embodiment.

FIG. 1C is a schematic diagram of a drilling-information-management system utilizing a memory device according to an exemplary embodiment. In situations where communication between the second computer 108, the database 110, or the third computer 152 is not possible, a memory device 154 coupled to the first computer 106 is utilized. In a typical embodiment, the memory device 154 may be a non-volatile memory device such as, for example, a universal serial bus (USB) flash device, a secure digital (SD) card, a compact flash (CF) card, or any other appropriate memory device. During operation, the memory device 154 receives and stores drilling information from the first computer 106. The memory device is manually disconnected from the first computer 106 and coupled to the third computer 152. Drilling information stored on the memory device 154 is then transferred to the third computer 152. In other embodiments, the memory device is coupled to the database 110 instead of the third computer 152.

Figure 2:
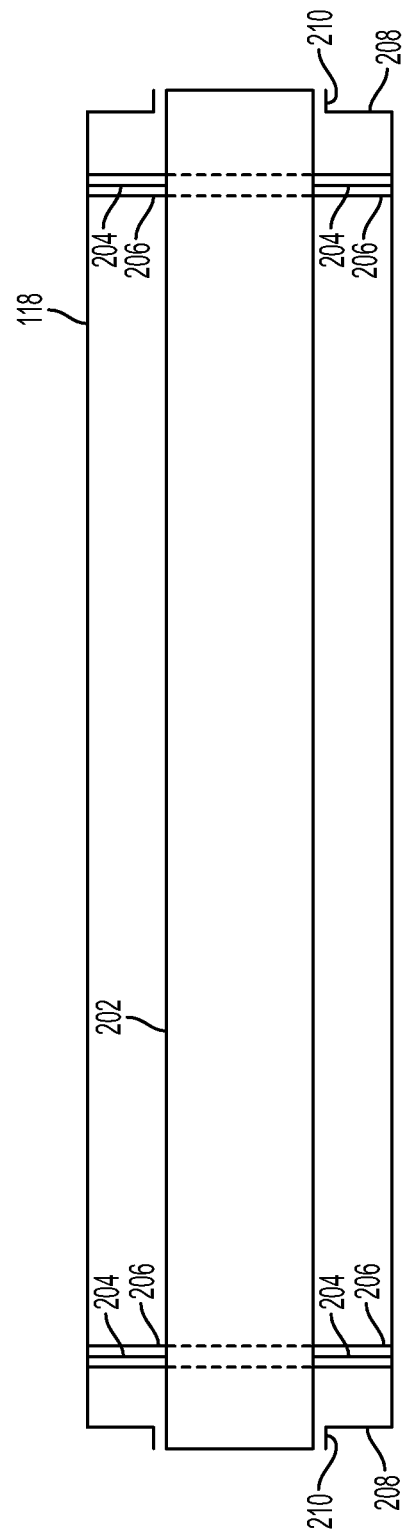
FIG. 2 is a cross-sectional view of a drill rod according to an exemplary embodiment.

FIG. 2 is a cross-sectional view of the drill rod 118 according to an exemplary embodiment. The drill rod 118 includes a conductor 202 that is arranged coaxially within the drill rod 118. In a typical embodiment, the conductor 202 is disposed such that an insulated electrical connection is established when, for example, the drill rod 118 is coupled to the adjacent drill rod (not explicitly shown). The conductor 202 is secured laterally within the drill rod 118 by centralizers 204. The centralizers 204 are held in place by at least one groove 206 cut into an inner diameter of the drill rod 118 at each end of the drill rod 118. A fitting 208 having an O-ring 210 is disposed at each end of the drill rod 118. The fitting 208 creates a substantially water-tight connection between the drill rod 118 and adjacent equipment such as, for example, the probe assembly 102 (shown in FIG. 1A), or the adjacent drill rod (not explicitly shown). In a typical embodiment, the conductor 202 is safe for use in gaseous and potentially explosive environments.

Figure 3:
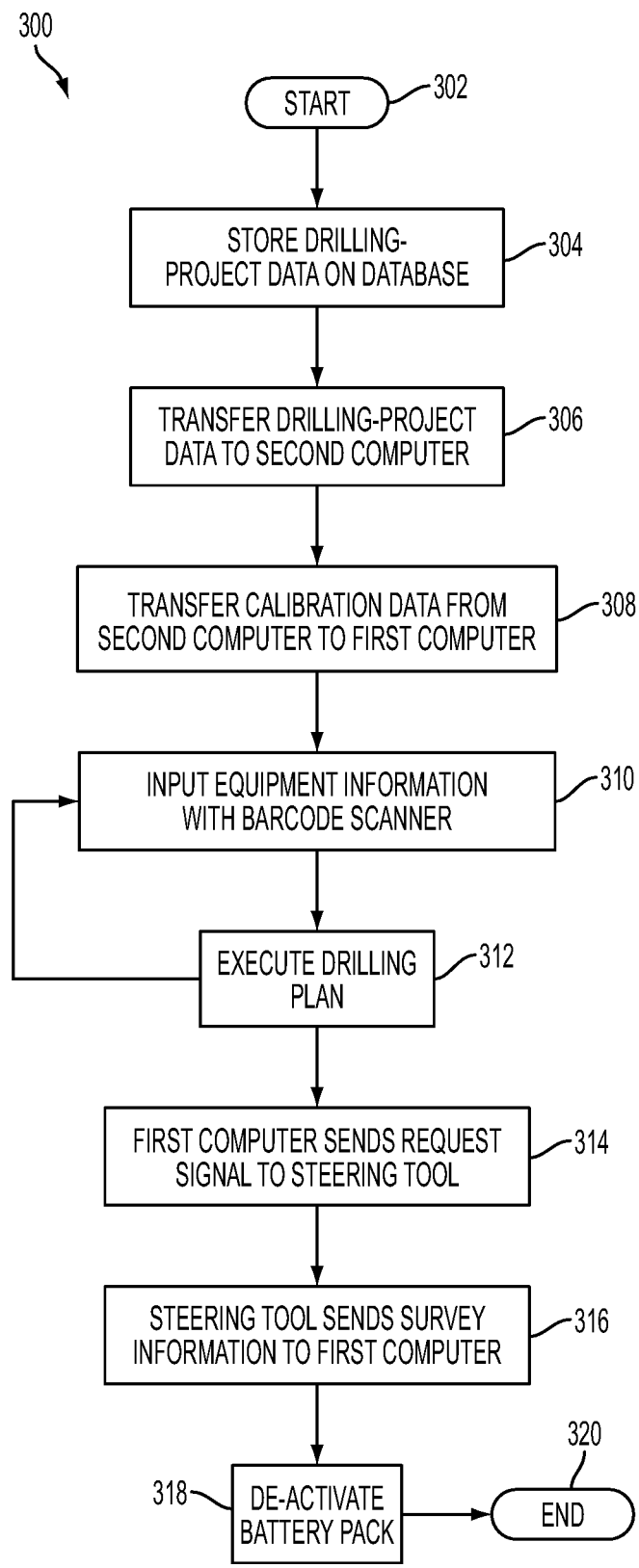
FIG. 3 is a flow diagram of a process for planning a directional-drilling project according to an exemplary embodiment.

Referring now to FIG. 3, there is shown a flow diagram of a process for planning a directional-drilling project according to an exemplary embodiment. A process 300 begins at step 302. At step 304, drilling-project data is transferred to, and stored on, the database 110. The drilling-project data includes, for example, borehole plans, project information, tool-calibration information, special instructions, inventory levels, consumables shipped, and software and manual updates. At step 306, the drilling-project data is retrieved from the database 110 by an on-site drilling operator and transferred to the second computer 108. At step 308, the on-site drilling operator transfers calibration data from the second computer 108 to the first computer 106. In a typical embodiment, the calibration data includes data points collected during the calibration process described above with respect to FIG. 1A. At step 310, the on-site drilling operator utilizes the barcode scanner 120 to input equipment information into the second computer 108. At step 312, the on-site drilling operator uses the first computer 106 to execute the drilling plan in accordance with the drilling-project data. Although step 312 is described in FIG. 3 as occurring after step 310, one skilled in the art will recognize that step 310 may be performed concurrently with, or after, step 312. Further, as illustrated in FIG. 3, step 310 may be repeated during the performance of step 312. At step 314, the first computer 106 provides a request signal to the probe assembly 102. The request signal activates the battery pack 111 (shown in FIG. 1A) within the probe assembly 102. At step 316, the probe assembly 102 transfers survey information to the first computer 106 for processing. The survey information includes, for example, a borehole name, a shot number, an amount of left-right deviation, an amount of up-down deviation, azimuth, pitch, date, time, and readings for shock and vibration as a function of hole depth.

Still referring to FIG. 3, the survey information may also include a gamma-polygon plot, which is a graphical representation of focused gamma readings a particular horizontal survey depth. A gamma-polygon plot is a polar plot of natural background gamma radiation as a radial coordinate and the gamma tool face as an angular coordinate. Background gamma radiation is typically measured in counts per second (CPS). A magnitude of a gamma reading at a particular gamma tool face is an indication of a type of rock being drilled and the proximity of the drill string 116 to a shale or other gamma-emitting strata. In a typical embodiment, a series of gamma-polygon plots are generated at various survey depths. The series of gamma-polygon plots allows a user to determine, based on differences in CPS, relative placement within a coal seam. At step 318, when the survey information has been transferred to the first computer 106, the battery pack 111 is de-activated and drilling commences. The process 300 ends at step 320.

Figure 4A:
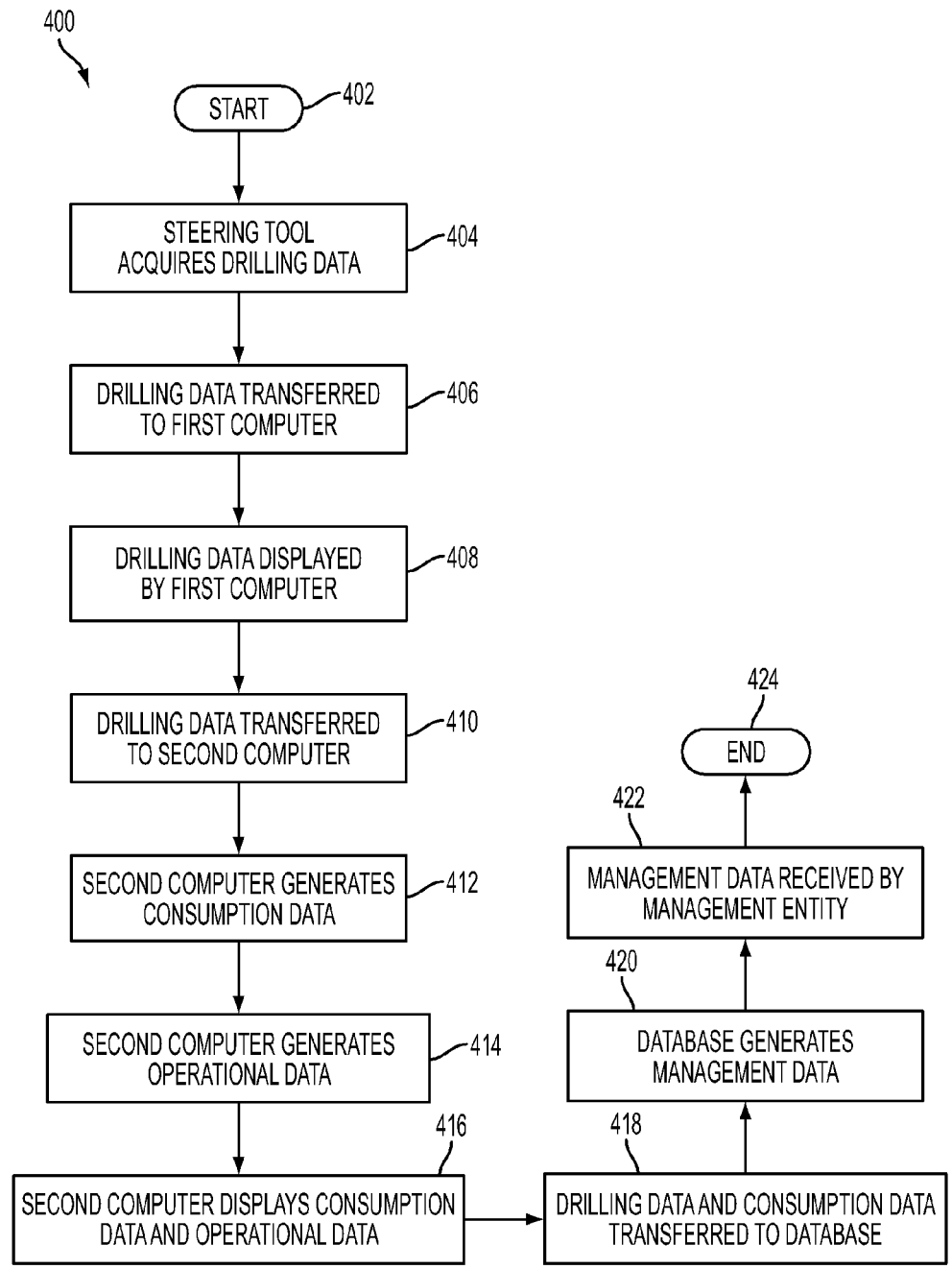
FIG. 4A is a flow diagram of a drilling-data-analysis process according to an exemplary embodiment.

Referring now to FIG. 4A, there is shown a flow diagram of a drilling-data-analysis process according to an exemplary embodiment. A drilling-data-analysis process 400 begins at step 402. At step 404, the probe assembly 102 acquires drilling data including, for example, directional data, geophysical data, and environmental data. The directional data may include, for example, at least one of a tool azimuth, a tool pitch, and a tool orientation. The environmental data may include, for example, at least one of a downhole temperature, a downhole magnetic field, a magnetic field dip, and a measure of vibration. The geophysical data may include, for example, data related to geophysical properties such as, for example, a gamma count, and a gamma tool face.

Still referring to FIG. 4A, at step 406, the drilling data is transferred to the first computer 106 via the conductor 202 disposed in the drill rod 118. At step 408, the drilling data is displayed by the first computer 106 via the user interface 119. The first computer 106 may provide the drilling data collected from the probe assembly 102 in tabular and graphical format including, for example, a drilling progress plot, drill-to-plan information, a downhole temperature, downhole geophysical data, and a gamma-polygon plot.

Still referring to FIG. 4A, at step 410, the drilling data is retrieved by the on-site drilling operator (not explicitly shown) and transferred to the second computer 108. At step 412, the second computer 108 collects consumption data including, for example, a quantity of consumables used, parts used, drilling activities, and materials required. At step 414, the second computer 108 utilizes the consumption data to generate operational data related to the drilling process including, for example, an equipment operational time (also known as "green-light time"), a delay period length, a cause of delay periods, component wear, and equipment use times to derive maintenance needs. At step 416, the drilling data, the consumption data, and the operational data are displayed by the second computer 108 via the display 123.

Still referring to FIG. 4A, at step 418 the second computer 108 transfers the drilling data, the consumption data, and the operational data to the database 110. As shown in FIG. 1B, in various embodiments, the drilling data and the consumption data may be transferred to the database 110 via the third computer 152. At step 420, the database 110 utilizes the drilling data, the consumption data, and the operational data to generate management data. In a typical embodiment, the management data may include, for example, ordering information for equipment and consumables, delivery information for equipment and consumables, customer-invoicing information, and performance-to-budget information. At step 422, a drilling-management entity retrieves the management data from the database 110. The process 400 ends at step 424.

Figure 4B:
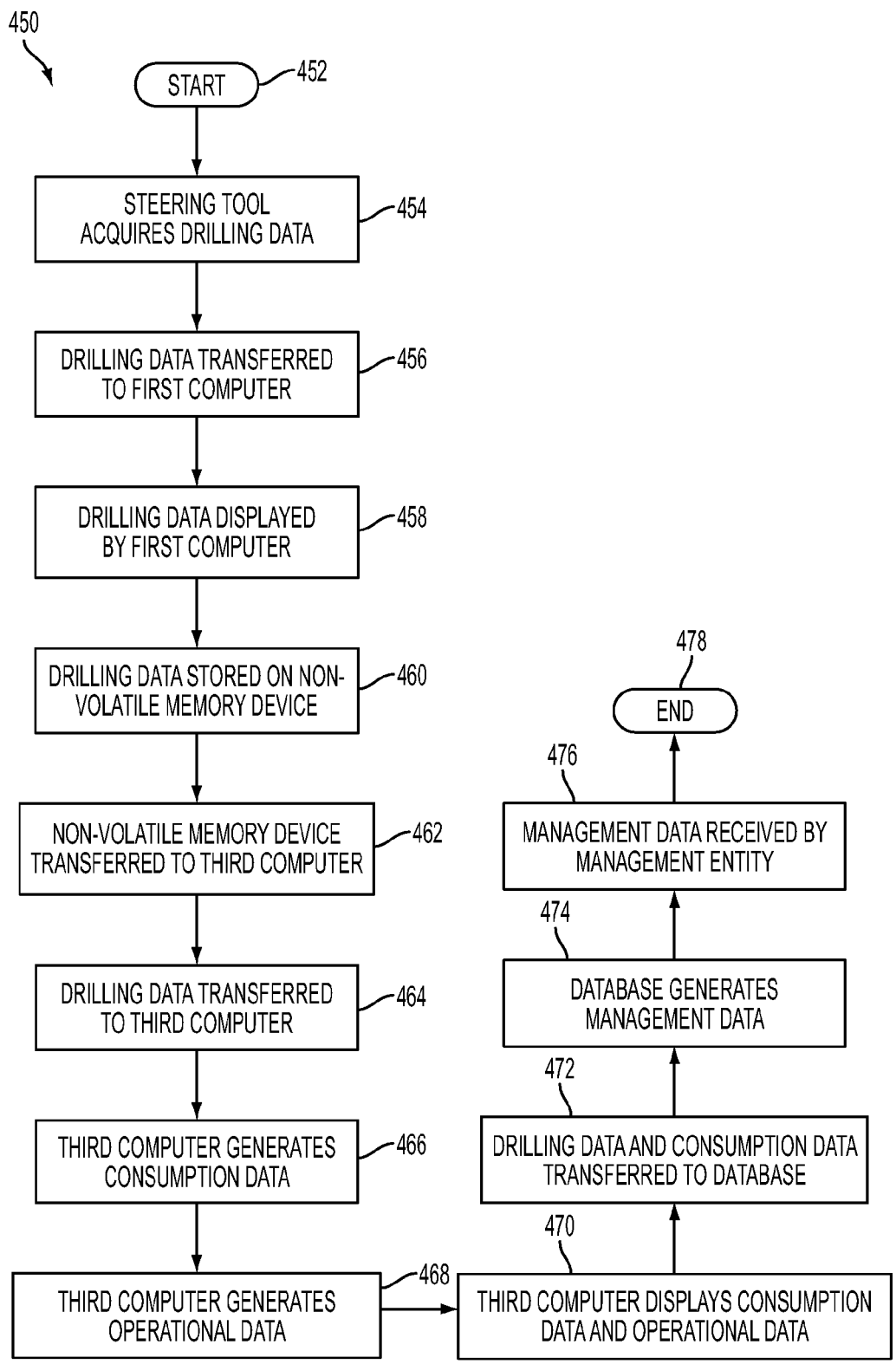
FIG. 4B is a flow diagram of a drilling-data-analysis process utilizing a memory device according to an exemplary embodiment.

FIG. 4B is a flow diagram of a drilling-data-analysis process utilizing a memory device according to an exemplary embodiment. A drilling-data-analysis process 450 begins at step 452. At step 454, the probe assembly 102 acquires the drilling data including, for example, the directional data, the geophysical data, and the environmental data. At step 456, the drilling data is transferred to the first computer 106 via the conductor 202 disposed in the drill pipe 118. At step 458, the drilling data is displayed by the first computer 106 via the user interface 119. The first computer 106 may provide the drilling data collected from the probe assembly 102 in tabular and graphical format including, for example, a drilling progress plot, drill-to-plan information, a downhole temperature, downhole geophysical data, and a gamma-polygon plot.

Still referring to FIG. 4B, at step 460, the drilling data is stored, by the first computer 106, on the memory device 154. At step 462, the memory device 154 is removed from the first computer 106 and transferred to the third computer 152. At step 464, the drilling data is transferred from the memory device 154 to the third computer 152. At step 466, the third computer 152 uses the drilling data to generate consumption data including, for example, a quantity of consumables used, parts used, drilling activities, and materials required. At step 468, the third computer 152 utilizes the consumption data to generate operational data related to the drilling process including, for example, an equipment operational time (also known as "green-light time"), a delay period length, a cause of delay periods, component wear, and equipment maintenance needs. At step 470, the drilling data, the consumption data, and the operational data may be displayed by the third computer 152.

Still referring to FIG. 4B, at step 472 the third computer 152 transfers the drilling data, the consumption data, and the operational data to the database 110 when communication between the third computer 152 and the database 110 is possible. At step 474 the database 110 utilizes the drilling data, the consumption data, and the operational data to generate management data. In a typical embodiment, the management data includes, for example, ordering information for equipment and consumables, delivery information for equipment and consumables, customer-invoicing information, and performance-to-budget information. At step 476, the drilling-management entity retrieves the management data from the database 110. The process 450 ends at step 478.

Figure 5:
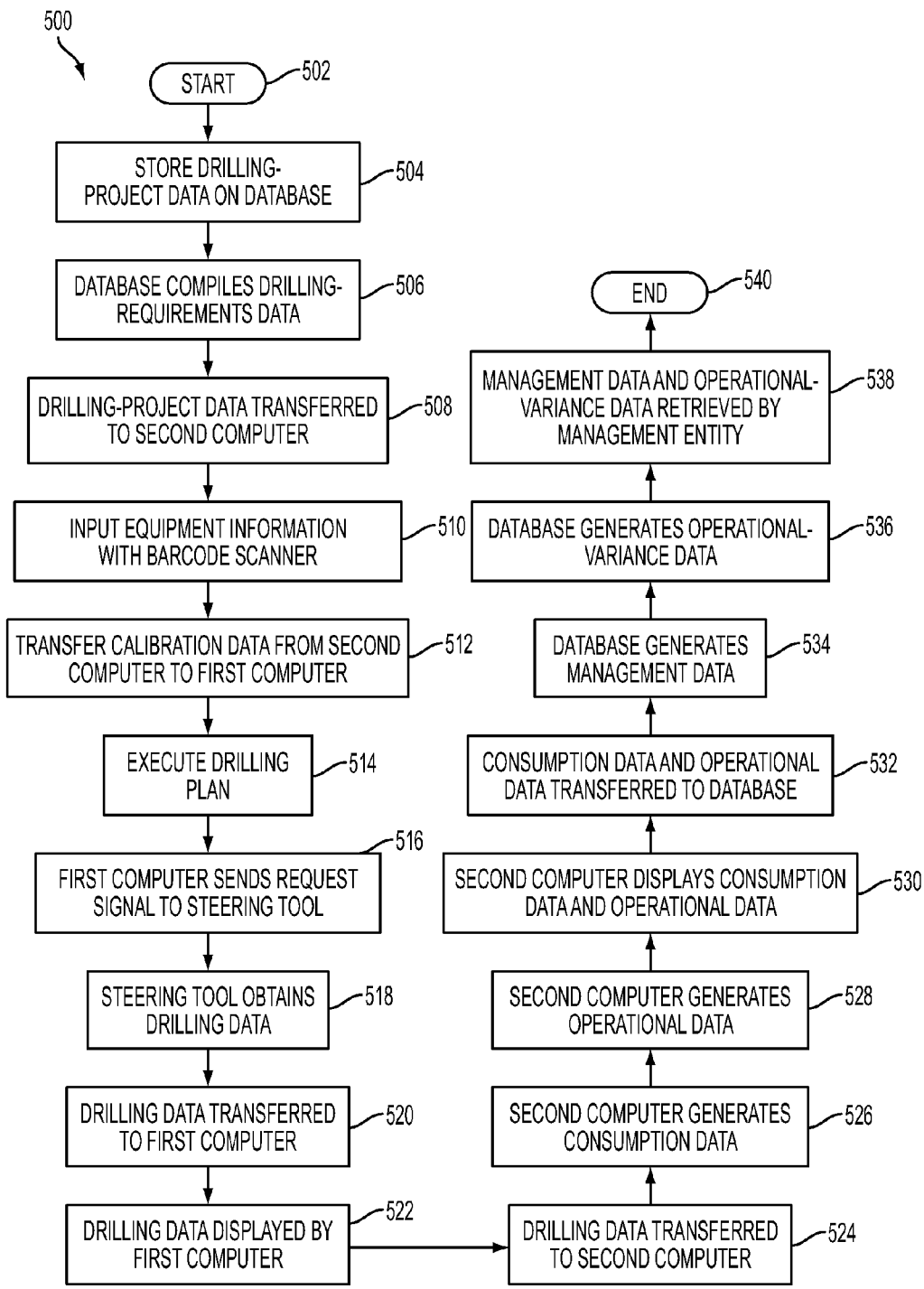
FIG. 5 is a flow diagram of a drilling-forecasting process according to an exemplary embodiment.

FIG. 5 is a flow diagram of a drilling-forecasting process according to an exemplary embodiment. A drilling-data-analysis process 500 begins at step 502. At step 504, drilling-project data is transferred to, and stored on, the database 110. At step 506, the database 110 compiles drilling-requirements data and delivers the drilling-requirements data to a drilling-management entity. The drilling-requirements data includes, for example, equipment requirement forecasts, consumable requirement forecasts, projected project budget, projected time to completion, current inventory levels, and ordering needs.

Still referring to FIG. 5, at step 508, the drilling-project data is retrieved from the database 110 by an on-site drilling operator (not explicitly shown) and transferred to the second computer 108. At step 510, the on-site drilling operator utilizes the barcode scanner 120 to input equipment information into the second computer 108. At step 512, the on-site drilling operator transfers calibration data from the second computer 108 to the first computer 106. In a typical embodiment, the calibration data includes data points collected during the calibration process described above with respect to FIG. 1A. By way of example, step 510 is described herein as being performed prior to step 512; however, in various alternative embodiments, step 510 and step 512 may be performed in any order. At step 514, the on-site drilling operator uses the first computer 106 to execute the drilling plan in accordance with the drilling-project data. At step 516, the first computer 106 provides a request signal to the probe assembly 102. The request signal activates the battery pack 111 (shown in FIG. 1A) within the probe assembly 102. At step 518, the probe assembly 102 obtains drilling data from a drilling environment. In a typical embodiment, the drilling data includes, for example, directional data, geophysical data, and environmental data. The directional data includes, for example, at least one of a tool azimuth, a tool pitch, and a tool orientation. The environmental data includes, for example, at least one of a downhole temperature, a downhole magnetic field, a magnetic field dip, and a measure of vibration. The geophysical data may include data related to geophysical properties such as, for example, a gamma count and a gamma tool face.

Still referring to FIG. 5, at step 520, the drilling data is transferred to the first computer 106 via conductor 202 disposed in the drill pipe 118. At step 522, the drilling data is displayed by the first computer 106 via the user interface 119. The first computer 106 provides the drilling data collected from the probe assembly 102 in, for example, tabular and graphical format including, for example, drilling progress plots, drill-to-plan information, downhole temperature, and downhole geophysical data. At step 524, the drilling data is retrieved by the on-site drilling operator (not explicitly shown) and transferred to the second computer 108. At step 526, the second computer 108 collects, via the barcode scanner 120, consumption data including, for example, a quantity of consumables used, parts used, drilling activities, and materials required. At step 528, the second computer 108 utilizes the consumption data to generate operational data related to the drilling process including, for example, an equipment operational time (also known as "green-light time"), a delay period length, a cause of delay periods, component wear, and equipment maintenance needs. At step 530, the drilling data, the consumption data, and the operational data are displayed by the second computer 108 via the display 123.

Still referring to FIG. 5, at step 532 the second computer 108 transfers the drilling data, the consumption data, and the operational data to the database 110. As shown in FIG. 1B, in various embodiments, the drilling data, the consumption data, and the operational data may be transferred to the database 110 via the third computer 152. At step 534, the database 110 utilizes the drilling data, the consumption data, and the operational data to generate management data. The management data includes, for example, ordering information for equipment and consumables, delivery information for equipment and consumables, customer-invoicing information, and performance-to-budget information. At step 536, the database 110 reconciles the drilling data and the consumption data with the drilling-requirements data to generate operational-variance data. The operational-variance data includes, for example, cost variance relative to budget, consumable variance relative to forecasted requirements, and duration variance relative to forecasted completion time. At step 538, the drilling-management entity retrieves the management data and the operational-variance data from the database 110. The process 500 ends at step 540.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A method for executing a directional-drilling project, the method comprising:
　storing, on a database, drilling-project data;
　transferring, to a second computer, the drilling-project data;
　uploading, to the second computer, equipment information;
　determining, via the second computer, calibration data, the calibration data comprising a difference between a magnetic azimuth and a grid azimuth;
　transferring, from the second computer to a first computer, the calibration data;
　executing, via the first computer, the directional-drilling project;
　recording, via the second computer, parameters related to the directional-drilling project, the parameters comprising at least one of consumables used, equipment service time, activities during a shift, a notification of equipment problems, and a notification of drilling problems; and
　utilizing the parameters to determine at least one of diagnostic information, borehole design assistance, drilling problem assistance, and equipment problem assistance.

2. The method of claim 1, wherein the survey information includes at least one plot of focused gamma readings at a horizontal survey depth.

3. The method of claim 2, comprising utilizing the at least one plot to determine relative placement within a coal seam.

4. The method of claim 1, wherein the drilling-project data comprises at least one of a borehole plan, tool-calibration information, inventory levels, and software updates.

5. The method of claim 1, wherein the survey information comprises at least one of a borehole name, a shot number, an amount of left-right deviation, an amount of up-down deviation, a tool azimuth, a tool pitch, a gamma-polygon plot, and a measurement of shock and vibration as a function of depth.

6. The method of claim 1, further comprising transferring, from a probe assembly to the first computer, survey information.

7. A method of managing a drilling project, the method comprising:
　storing, on a database, drilling-project data;
　compiling, via the database, drilling-requirements data;
　transferring, to a drilling-management entity, the drilling-requirements data;
　transferring the drilling-project data to a second computer;
　uploading, to the second computer, equipment information;
　determining, via the second computer, calibration data, the calibration data comprising a difference between a magnetic azimuth and a grid azimuth;
　transferring the calibration data from the second computer to a first computer;
　executing, via the first computer, a drilling plan utilizing the drilling-project data;
　recording, via the second computer, parameters related to the directional-drilling project, the parameters comprising at least one of consumables used, equipment service time, a list of activities performed during a shift, a notification of equipment problems, and a notification of drilling problems; and
　utilizing the parameters to determine at least one of diagnostic information, borehole design assistance, drilling problem assistance, and equipment problem assistance.

8. The method of claim 7, wherein the drilling-requirements data comprises at least one of an equipment requirements forecast, a consumables requirements forecast, a projected project budget, a projected time to completion, a current inventory level, and ordering needs.

9. The method of claim 7, further comprising:
　Sending, from the first computer to a probe assembly, a request to collect drilling data;
　acquiring, via the probe assembly, the drilling data;
　transferring the drilling data from the probe assembly to the first computer;

retrieving, via the second computer, the drilling data from the first computer;

generating, via the second computer, at least one of consumption data and operational data from the drilling data; and transferring at least one of the drilling data, the consumption data, and the operational data to the database.

10. The method of claim 9, further comprising utilizing at least one of the drilling data, the consumption data, and the operational data to generate at least one of management data and operational-variance data.

11. The method of claim 10, wherein the management data comprises at least one of equipment ordering information, consumable ordering information, equipment delivery information, consumable delivery information, customer-invoicing information, and performance-to-budget information.

12. The method of claim 10, wherein the operational-variance data comprises at least one of cost variance relative to budget, consumable variance relative to forecasted requirements, and project duration variance relative to forecasted completion time.

13. The method of claim 9, wherein the drilling data comprises at least one of geophysical data, directional data, and environmental data.

14. The method of claim 13, wherein:
the geophysical data comprises at least one of gamma count and gamma tool face;
the directional data comprises at least one of a tool azimuth, a tool pitch, and a tool orientation; and
the environmental data comprises at least one of a downhole temperature, a downhole magnetic field, a magnetic field dip, and a measurement of downhole vibration.

15. The method of claim 14, comprising utilizing the geophysical data to create at least one plot of focused gamma readings at a horizontal survey depth.

16. The method of claim 15, comprising utilizing the at least one plot to determine relative placement within a coal seam.

17. The method of claim 9, further comprising displaying the drilling data.

18. The method of claim 9, wherein the consumption data comprises at least one of a quantity of consumables used, a list of parts used, a list of drilling activities, and a list of materials required.

19. The method of claim 9, wherein the operational data comprises at least one of an equipment operational time, a delay period length, component wear, and equipment maintenance needs.

20. A drilling-information-management system comprising:
a probe assembly disposed on a drill string;
a first computer interoperably coupled to the probe assembly via the drill string, the drill string comprising a drill rod;
a conductor disposed within the drill rod, wherein electrical signals are transmitted between the probe assembly and the first computer via the conductor;
a second computer in communication with the first computer, the second computer comprising a barcode scanner and operable to store calibration data, wherein calibration data is transferred from the second computer to the first computer;
a database interoperably coupled with the second computer, wherein drilling-project data is transferred from the database to the second computer; and
wherein the first computer executes a drilling plan according to the drilling-project data.

\* \* \* \* \*